United States Patent
Shiomi

(10) Patent No.: US 7,948,566 B2
(45) Date of Patent: May 24, 2011

(54) LIQUID CRYSTAL DISPLAY APPARATUS HAVING AN INPUT GRADATION SET TO HAVE A RELATIONSHIP ALONG A GAMMA CURVE

(75) Inventor: Makoto Shiomi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 233 days.

(21) Appl. No.: 12/224,854

(22) PCT Filed: Dec. 18, 2006

(86) PCT No.: PCT/JP2006/325212
§ 371 (c)(1),
(2), (4) Date: Sep. 8, 2008

(87) PCT Pub. No.: WO2007/111012
PCT Pub. Date: Oct. 4, 2007

(65) Prior Publication Data
US 2009/0046215 A1 Feb. 19, 2009

(30) Foreign Application Priority Data
Mar. 27, 2006 (JP) .................. 2006-086207

(51) Int. Cl.
G02F 1/1335 (2006.01)
(52) U.S. Cl. ......................... 349/15; 349/107
(58) Field of Classification Search .......... 349/6, 11–16, 349/107
See application file for complete search history.

(56) References Cited

U.S. PATENT DOCUMENTS

| 5,459,596 | A | 10/1995 | Ueda et al. |
| 5,600,461 | A | 2/1997 | Ueda et al. |
| 6,128,059 | A * | 10/2000 | Nishiguchi ................... 349/129 |
| 6,703,989 | B1 | 3/2004 | Harrold et al. |
| 2003/0006978 | A1 | 1/2003 | Fujiyoshi |
| 2005/0168424 | A1 | 8/2005 | Nakamoto et al. |
| 2006/0279502 | A1* | 12/2006 | Chang ............................ 345/95 |

FOREIGN PATENT DOCUMENTS

| GB | 2 351 866 | 7/1999 |
| JP | 2005-321449 | 11/2005 |

* cited by examiner

Primary Examiner — Brian M. Healy
Assistant Examiner — Paul C Lee
(74) Attorney, Agent, or Firm — Harness, Dickey & Pierce, P.L.C.

(57) ABSTRACT

In a liquid crystal display apparatus realizing a dual view display by bonding a liquid crystal panel and a parallax barrier, the parallax barrier separates display images by treating three pixels including R, G, and B pixels as one unit (one picture element). At this time, luminance variation due to crosstalk concentrates on a right-end pixel among the three pixels constituting the one picture element (in a case where each pixel receives data from a source line immediately on the left of the pixel). Accordingly, the right-end pixel is arranged to be a B pixel that has a low correlation with luminance information and in which influence of crosstalk is hard to be viewed. Further, an applied voltage to be supplied to the display pixel of the B (blue) color and an input gradation are set to have a relationship along a γ curve that makes luminance variation difficult to occur in a low luminance area.

8 Claims, 7 Drawing Sheets

LIQUID CRYSTAL DISPLAY APPARATUS HAVING AN INPUT GRADATION SET TO HAVE A RELATIONSHIP ALONG A GAMMA CURVE

TECHNICAL FIELD

The present invention relates to a liquid crystal display apparatus that performs a dual view display, in particular, to a liquid crystal display apparatus that improves color reproducibility by reducing color crosstalk.

BACKGROUND ART

A problem of crosstalk is pointed out as a specific problem in a TFT-LCD. The crosstalk occurs because adjacent pixels are connected via a parasitic capacitance. In other words, when an insulating film intervenes between a transparent electrode and a source line, a parasitic capacitance is produced between the transparent electrode and the source line. In the same manner, parasitic capacitances are produced between a gate line and the transparent electrode and between the source line and a common electrode, respectively. Due to influence of these parasitic capacitances and a capacitance of a liquid crystal itself, an electric potential of a display pixel becomes different from a desired voltage when a gate is turned OFF. Consequently, a display gradation becomes different from a desired gradation.

In other words, at the moment a gate is high, a desired voltage is applied to a display pixel that is connected to a TFT. However, when the gate is low, the pixel is connected to many peripheral electric circuits via parasitic capacitances. Because many of these peripheral electric circuits are related to panel design, a driving voltage can be set in advance in consideration of parasitic capacitances between the display pixel and the peripheral electric circuits. Therefore, the crosstalk caused by the parasitic capacitances that are formed between the display pixel and the peripheral electric circuits can be compensated in advance. However, an electric potential of a source line that drives other display pixel cannot be determined in advance. Therefore, it is difficult to compensate, in advance, crosstalk that is caused by other source line.

As illustrated in FIG. 6(a), in a liquid crystal display apparatus, source lines Si ("i" is an integer) and gate lines Gj (j is an integer) are provided to be orthogonal. At each intersection of source lines Si and gate lines Gj, a display pixel 100 and a switching element 200 are provided. Regarding a display pixel (A) among the display pixels 100, parasitic capacitances Csda, Csdb, Cgd, and Ccs are formed as follows. A display pixel (B) indicates a display pixel that is adjacent to the display pixel (A) in a direction along which a gate line is provided.

The details of the parasitic capacitances Csda, Csdb, Cgd, and Ccs are as follows:

the parasitic capacitance Csda: a parasitic capacitance that is formed between a source line S2 for driving display pixels (A) and the display pixel (A);

the parasitic capacitance Csdb: a parasitic capacitance that is formed between a source line S3 for driving display pixels (B) and the display pixel (A);

the parasitic capacitance Cgd: a parasitic capacitance that is formed between a gate line G2 for driving display pixels (A) and the display pixel (A); and the parasitic capacitance Ccs: a parasitic capacitance that is formed between a common electrode line and the display pixel (A).

A capacitance of the display pixel (A) itself is Cp and a voltage which is applied to each gate line varies as shown in FIG. 6(b). Furthermore, while the display pixel (A) displays a G color, the display pixel (B) displays an R color or B color. In addition, in a case where a gradation of the display pixel (A) is LA and a gradation of the display pixel (B) is LB, LA≠LB.

In this case, at the time at which the gate is high, when a drain voltage +V(A) is applied to a liquid crystal part of the display pixel (A), a drain voltage −V (B) is applied to a liquid crystal part of the display pixel (B). Then, when a next gate line is turned ON, −V (A) is applied to the source line that drives the display pixel (A) and +V (B) is applied to a source line that drives the display pixel (B).

However, in the reality, the above-mentioned drain voltage is not applied directly to the display pixel (A). A drain voltage that is varied due to the influence of the parasitic capacitances is applied to the display pixel (A). Specifically, an effective value Va of a voltage that is applied to the display pixel (A) is represented by $$Va = V(A) + (Csda*V(A) + Cgd*Vg + Csdb*V(B) + Ccs*Vc)/Cp,$$

where: Vg is a voltage that is applied to the gate line; and Vc is a voltage that is applied to an opposed electrode.

In this way, a voltage different from a desired drain voltage (A) is applied to the display pixel (A).

The parasitic capacitances Csda, Cgd, and Ccs that are formed between the display pixel (A) and the respective lines as mentioned above are predictable at a stage of designing. Therefore, a drain voltage can be set in consideration of values of the parasitic capacitances. Accordingly, these parasitic capacitances do not have much influence on a display gradation of the display pixel (A).

However, the calculation formula of the effective voltage Va above includes the parasitic capacitance Csdb and a drain voltage V(B). In other words, the voltage Va is influenced by the source line that is connected to the display pixel (B). This causes color crosstalk that changes the gradation of the display pixel (A) according to a display gradation of the display pixel (B). For example, Patent Document 1 discloses a method of solving the problem of the color crosstalk by correcting a display signal.

[Patent Document 1] Japanese Unexamined Patent Publication No. 202377/2005 (*Tokukai* 2005-202377 (published on Jun. 28, 2005))

DISCLOSURE OF INVENTION

However, in a conventional arrangement, a circuit and a process for correction become complicated.

Further, in a normal display mode in which the same image is displayed with respect to all display directions, color crosstalk mentioned above does not occur prominently for the following reason. That is, in a normal display state, image data of adjacent source lines are of the same image. In regard to luminances of the image data of the adjacent source lines, the image data that relate to R, G, and B colors are highly correlated to one another. Therefore, even if crosstalk occurs, influence of the crosstalk is hard to appear in a visible image.

On the other hand, recently, a display mode (hereinafter, referred to as a dual view display) in which different images can be displayed with respect to a plurality of display directions, respectively, is realized. In such a mode, a display panel is combined with a parallax barrier. In this dual view display, the problem of the crosstalk caused by other source line becomes particularly prominent.

That is, in the dual view display, as illustrated in FIG. 7, a specific viewing angle is given, by a parallax barrier 120 that is provided outside a display panel 110, to each of first and second images that are produced by the display panel 110. This allows, as illustrated in FIG. 8, displaying different images to a plurality of observers at different observation points, respectively.

In the dual view display, data of a different image is provided to each source line. The display is performed by separating, with the use of the parallax barrier, the different images into different directions, respectively. Accordingly, the image data of the adjacent source lines relate to different images, respectively. As a result, the influence of the crosstalk to a visible image becomes large.

The present invention is attained in view of the above problem. The object of the present invention is to reduce, by a simple method, color crosstalk in a liquid crystal display that performs a dual view display.

In order to achieve the object above, in a liquid crystal display apparatus of the present invention allowing a display mode in which a different image can be displayed with respect to each of a plurality of display directions to be realized by bonding a liquid crystal panel and a parallax barrier, the liquid crystal panel being provided with a display pixel including a switching element and a pixel electrode which display pixel corresponds to each intersection of a plurality of gate lines and a plurality of source lines: the parallax barrier separates display images viewed in different directions, respectively, by treating, as one unit, three pixels including R, G, and B pixels provided in a direction in which a gate line is extended; in a case where, among the three pixels constituting the one unit, a pixel that is present at one end in the direction in which the gate line is extended is a first display pixel and a pixel that is adjacent to the first display pixel and belongs to a display image that is separated into a display direction different from that of the first display pixel is a second display pixel, a source line connected to the second display pixel is adjacent to the first display pixel, the first display pixel is a display pixel of a B (blue) color, and an applied voltage to be supplied to the display pixel of the B (blue) color and an input gradation are set to have a relationship along a γ curve that makes luminance variation difficult to occur in a low luminance area, compared with applied voltages supplied to display pixels of R (red) and G (green) colors, respectively.

According to the arrangement, in a pixel other than the first display pixel, influence of crosstalk from other source line (other than a source line that supplies data to the pixel other than the first display pixel) is hard to appear because the pixel other than the first display pixel and a pixel that is connected to the other source line relate to the same image and are highly correlated to each other. On the other hand, influence of crosstalk that is caused by other source line (other than a source line that supplies data to the first display pixel) easily appears in the first display pixel because the first display pixel and a pixel that is connected to the other source line relates to images different from each other and are not correlated.

In other words, influence of the crosstalk is concentrated in the first display pixel, by treating three pixels including R, G, and B pixels as one unit in separation of display images with the use of a parallax barrier at the time when a dual view display is performed. By arranging the first display pixel to be a B pixel that has a low correlation with luminance information, a change in a luminance due to the crosstalk can be suppressed. Accordingly, influence of the crosstalk to a display screen can be reduced.

Further, the applied voltage to be supplied to the display pixel of the B (blue) color and the input gradation are set to have a relationship along a γ curve that makes luminance variation difficult to occur in a low luminance area (dark area), compared with applied voltages supplied to display pixels of R (red) and G (green) colors, respectively (γ of B is set large in the dark area).

This is for two reasons. A ratio of luminance variation due to crosstalk becomes larger in a darker area. However, in an area that is darker than a certain level, even if the luminance changes at a large ratio, the luminance variation becomes insensible. In a bright area, because the ratio of the luminance variation is small, it is clearly not necessary to care about color crosstalk. That is, influence of the color crosstalk is the largest in a half-tone area that is relatively dark. The relatively dark area can be avoided by setting γ so that γ on a low gradation side is relatively large. γ may be separately set such that, for example, γ of a gradation not more than a certain level is 2.5 and γ of a gradation not less than the certain level is 2.2. In particular, it is preferable to set γ so that γ of a gradation not less than $128^{th}$ gradation is 2.2 and γ of a gradation not more than $128^{th}$ gradation varies sequentially from 2.2 towards 2.5 that is γ at $0^{th}$ gradation. This is for the purpose of realizing a gradation display characteristic that is relatively sequential and smooth even in a case where the crosstalk tends to influence the gradation display. The γ of 2.5 that is set here is one example. The γ may be set as appropriate according to an application, as long as a video image does not deviate largely from the image in a case where γ is set to 2.2 as in a general case.

BEST MODE FOR CARRYING OUT THE INVENTION

One embodiment of the present invention is explained with reference to drawings.

Figure 2:
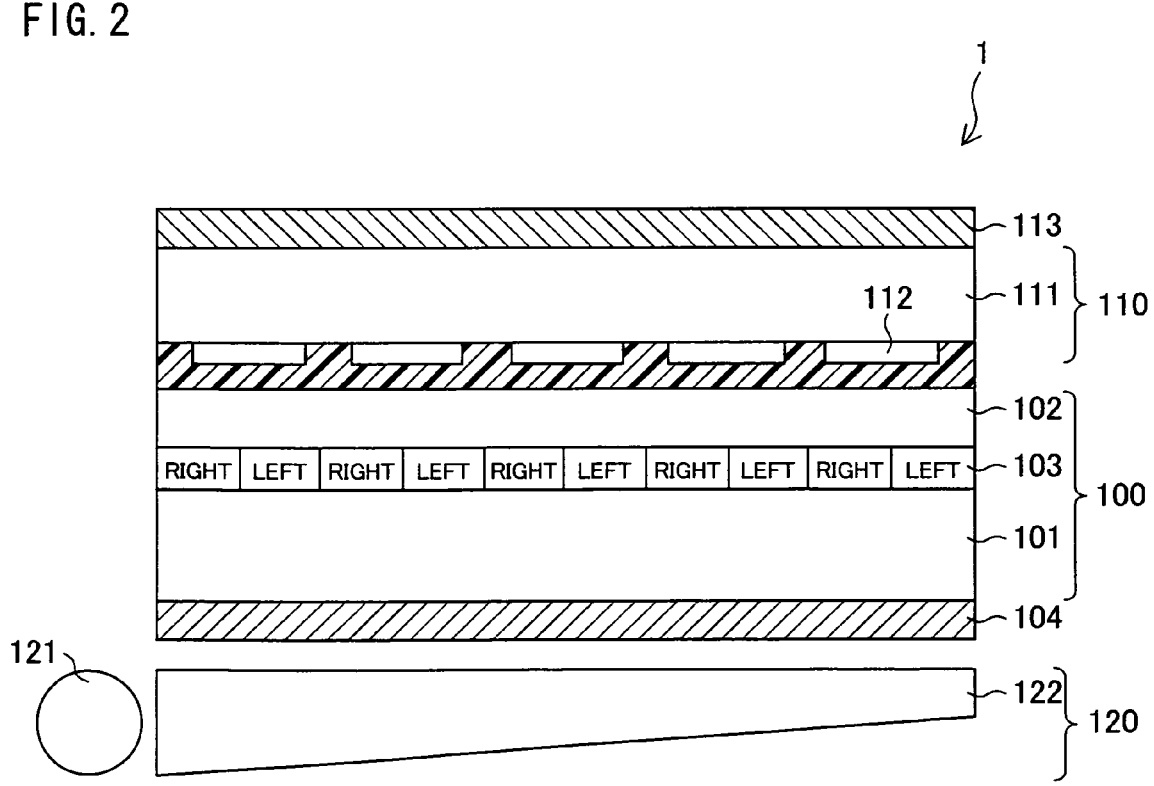
FIG. 2 is a cross sectional view schematically illustrating an arrangement of the color liquid crystal display apparatus.

First, FIG. 2 schematically illustrates an arrangement of a liquid crystal display apparatus 1 of the present embodiment. The liquid crystal display apparatus 1 is a color liquid crystal display apparatus that is capable of performing a dual view display. As illustrated in FIG. 2, roughly, the liquid crystal display apparatus 1 includes a display panel 100, a parallax barrier 110, and a backlight 120.

The backlight 120 includes a light source 121 and a reflecting section 122. The reflecting section 122 reflects light that is emitted from the light source 121, so that light is irradiated on the display panel 100. Examples of the light source 121 are an LED (Light Emitting Diode), a CCFT (Cold Cathode Fluorescent Tube), and a CCFL (Cold Cathode Fluorescent Lump).

The display panel 100 is an active matrix type liquid crystal display panel in which a liquid crystal layer 103 made of a nematic liquid crystal is sandwiched between a TFT (Thin Film Transistor) substrate 101 and a CF (Color Filter) substrate 102 that are provided so as to face each other.

Figure 1A:
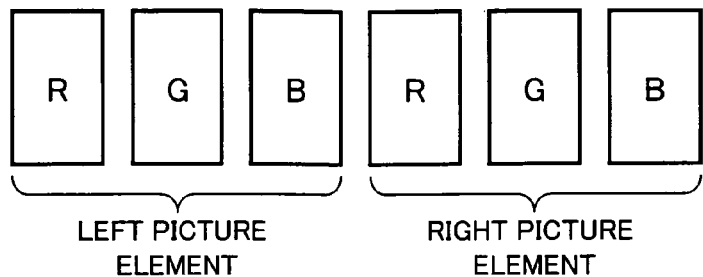
FIG. 1(a) is a plan view showing an embodiment of the present invention and a positional relationship of a picture element and R, G, and B pixels in a color liquid crystal display apparatus.

The TFT substrate 101 is provided with a plurality of source lines and a plurality of gate lines each intersecting each of the source lines. At each intersection of a source line and a gate line, a pixel is provided. As illustrated in FIG. 2, the pixels are provided along a direction in which a data signal line (not shown) is extended so that pixels of a left picture element line for an image display to a left side (an image display to a left side of the display apparatus) is provided alternatively with pixels of a right picture element line for an image display to a right side (an image display to a right side of the display apparatus). As illustrated in FIG. 1(a), each of the left picture element and the right picture element are formed so as to have R, G, and B pixels as one set.

On the CF substrate 102, a color filter layer (not shown) is provided. In the color filter layer, R, G, and B filters are provided so as to correspond to respective pixels.

On opposed surfaces of the TFT substrate 101 and the CF substrate 102 are provided with alignment films (not shown), respectively. The alignment films have been subjected to alignment treatments in directions that are substantially perpendicular to each other, respectively. A surface of the TFT substrate 101 on a side provided with the backlight 120 is provided with a polarizer 104.

The parallax barrier 110 is made of a barrier glass 111 and a barrier light-blocking layer 112. The barrier light-blocking layer 112 is formed by patterning a metal layer or a resin layer on the barrier glass 111. On a display surface side of the barrier glass 111 (an opposite side with respect to a side provided with the backlight 120), a polarizer 113 is provided.

The barrier light-blocking layer 112 is provided so as to form, for example, striped lines in a direction parallel to a direction in which the picture element lines are extended. A material of the barrier light-blocking layer 112 is not specifically limited. The barrier light-blocking layer 112 may be formed, for example, by using a photosensitive resin in which black pigments are dispersed or by patterning a metal thin film.

Figure 1B:
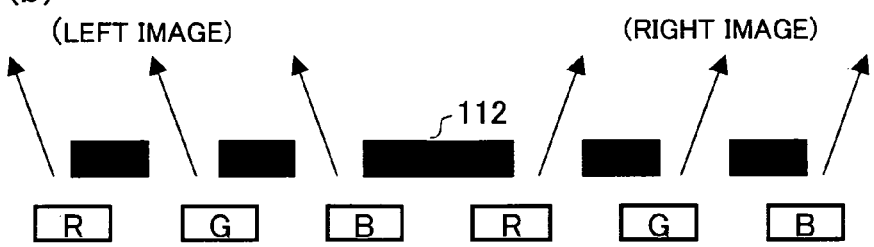
FIG. 1(b) is a diagram showing the embodiment of the present invention and illustrating an example of a structure in a case where separation is carried out by providing a barrier light-blocking layer and treating three pixels including R, G, and B pixels as one unit.

Further, each line of the barrier light-blocking layer 112 is provided so as to correspond to each picture element line of the display panel 100. Namely, the barrier light-blocking layer 112 separates a right image and a left image by treating three pixels including R, G, and B pixels as one unit. FIG. 1(b) illustrates an example of a structure in a case where separation is performed by providing the barrier light-blocking layer 112 and treating three pixels including R, G, and B pixels as one unit.

In this way, as illustrated in FIGS. 1(a) and 1(b), the separation of a right image and a left image with the use of the barrier light-blocking layer 112 is performed by treating the three pixels (corresponding to R, G, and B pixels) as one unit. In such a case, in a structure in which data is supplied to each pixel from a source line on the left side of the pixel, crosstalk that is caused by other source line largely influences only a pixel at the right end among the three pixels constituting one unit.

In other words, in the above-mentioned structure, a left-end pixel (R pixel in FIGS. 1(a) and 1(b)) among the three pixels constituting one unit is influenced by crosstalk from a source line that supplies data to a pixel (a center pixel among the three pixels constituting one unit: G pixel in FIGS. 1(a) and 1(b)) immediately on the right of the left-end pixel. However, the left-end pixel and the center pixel relate to an identical image. Therefore, the left-end pixel and the center pixel are highly correlated to each other. Accordingly, even when crosstalk occurs, influence of the crosstalk is hard to appear in a visible image. In the same manner, although the center pixel is influenced by crosstalk from a source line that supplies data to a right-end pixel (B pixel in FIGS. 1(a) and 1(b)) immediately on the right of the center pixel, the crosstalk is hard to appear in a visible image.

On the other hand, the right-end pixel is influenced by crosstalk from a source line that supplies data to another left-end pixel immediately on the right of the right-end pixel. Here, the right-end pixel and the another left-end pixel relates to different images, respectively. Therefore, display data of the right-end pixel and the another left-end pixel are not correlated to each other. Therefore, the right-end pixel is influenced by crosstalk more than the left-end pixel and the center pixel.

The above explanation assumes a structure in which data is supplied to each pixel from a source line that is provided on the left of the pixel. Accordingly, the right-end pixel is largely influenced by crosstalk. However, in the present invention, it is assumed that, among three pixels constituting one unit, (i) a first display pixel is a pixel provided to one end in a direction in which the gate line is extended and (ii) a second display pixel is a pixel that is adjacent to the first display pixel and belongs to a display image separated into a display direction different from that of a display image to which the first display pixel belongs. On this assumption, the first display pixel is a pixel that is largely influenced by crosstalk. In such a case, an end pixel on a side adjacent to a source line that connects to the second display pixel is the first display pixel.

Here, the present invention has a feature such that the first display pixel is arranged to be a B pixel, as illustrated in FIGS. 1(a) and 1(b), so that influence of crosstalk to the first display pixel is reduced.

That is, the larger a change in luminance due to crosstalk that is caused by other source line is, the more easily the crosstalk is viewed. On the other hand, in regard to correlation of each of R, G, and B colors and a luminance, R and G colors have a high correlation with luminance information while B color has a low correlation with luminance information. Accordingly, by arranging the first display pixel to which the influence of crosstalk is large to be a B color pixel whose correlation with luminance information is low, a change in the luminance due to crosstalk can be suppressed and influence of the crosstalk to a display screen can be reduced.

In other words, in the liquid crystal display apparatus 1 of the present embodiment, separation of display images with the use of a parallax barrier is performed by treating the three pixels including R, G, and B pixels as one unit, when a dual view display is performed. This concentrates the influence of the crosstalk in the first display pixel. Further, by arranging the first display pixel to be a B pixel that has a low correlation with luminance information, a change in the luminance can be suppressed, thereby reducing the influence to the display screen.

Further, in the liquid crystal display apparatus 1, γ correction capable of further suppressing influence of crosstalk is carried out in the first display pixel in which the influence of the crosstalk is large.

Specifically, when the γ correction is carried out with respect to data of a B color, a γ curve of the data is set deep so that influence of crosstalk in a dark area becomes hard to see. This is because a color shift due to a change in luminance is more easily seen in a dark area than in a bright area. By setting a γ value of B in a dark area to be small, a change in luminance in the display region of B becomes hard to be produced even when a potential changes due to an adjacent source line (R).

Figure 3:
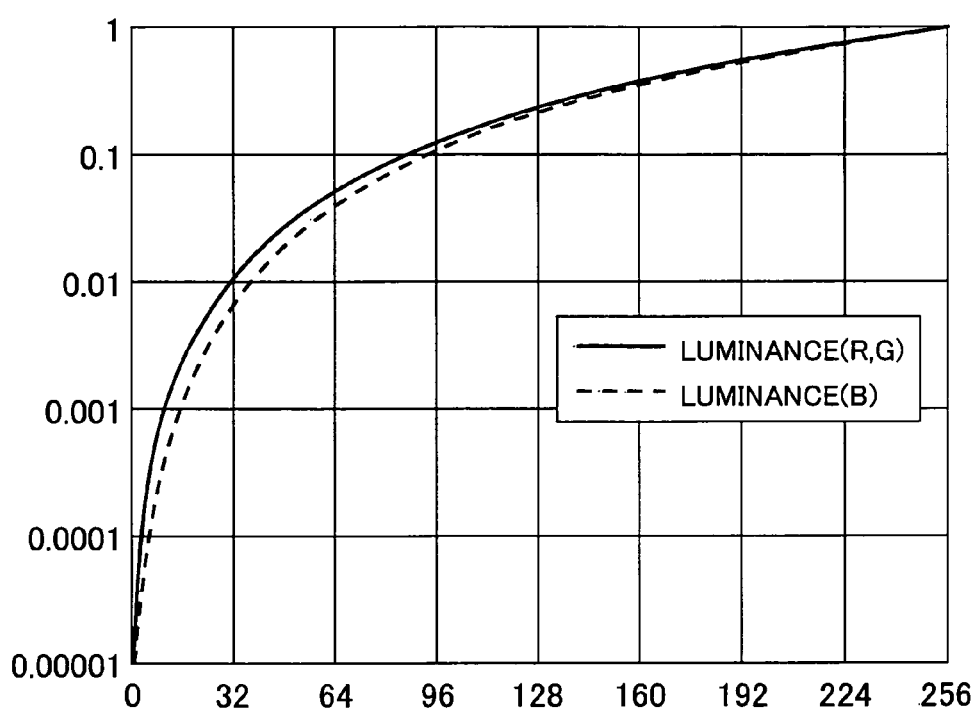
FIG. 3 is a graph illustrating an example of a setting of a γ curve.

FIG. 3 as follows illustrates an example of a setting of the γ curve. A curve illustrated by a solid line in FIG. 3 shows a general γ curve that is generally used. However, in the liquid crystal display apparatus 1 of the present embodiment, the curve illustrated by the solid line in FIG. 3 is used for γ correction with respect to data of R and G colors. Moreover, a curve illustrated by a dotted line in FIG. 3 shows a curve that is used for the γ correction with respect to data of a B color.

The following explains an example of a circuit configuration that carries out γ correction with respect to an input gradation signal and generates a write signal for a liquid crystal panel in the liquid display apparatus 1 of the present embodiment.

Figure 4:
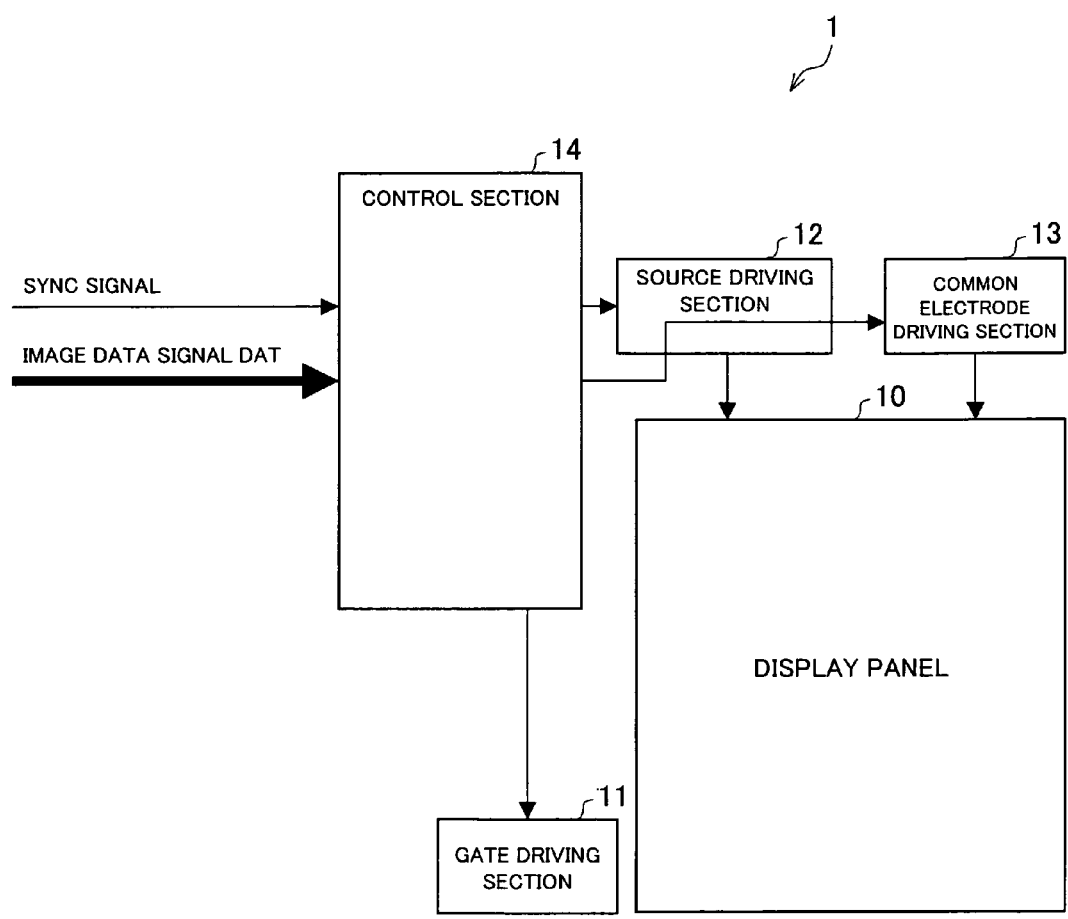
FIG. 4 is a block diagram schematically illustrating a structure of the color liquid crystal display apparatus.

As illustrated in FIG. 4, the liquid crystal display apparatus 1 includes a display panel 10, a gate driving section 11, a source driving section 12, a common electrode driving section 13, and a control section 14.

The display panel 10 (detailed illustration thereof is omitted here) includes m gate lines that are parallel to each other, n source lines that are parallel to each other, and pixels arranged in a matrix. Each pixel is formed in a region that is surrounded by two of the gate lines adjacent to each other and two of the source lines adjacent to each other.

The gate driving section 11 sequentially generates scanning signals that are to be provided to the gate lines to which pixels in each line are connected, according to gate clock signals and gate start pulses that are outputted from the control section 14.

The source driving section 12 samples image data signals DAT in accordance with the source clock signals and the source start pulses that are outputted from the control section 14, and outputs image data obtained to the source lines to which pixels in each line are connected.

The control section 14 is a circuit that generates and outputs, in accordance with a sync signal and an image data signal DAT that are inputted, various kinds of control signals that control operations of the gate driving section 11 and the source driving section 12. As mentioned above, clock signals, start pulses, the image data signals DAT, and the like are prepared as control signals that are outputted from the control section 14.

Each pixel of the display panel 10 includes a switching element such as a TFT, and a liquid crystal capacitor. In such a pixel, a gate of the TFT is connected to a gate line. Moreover, a source line is connected to one electrode of the liquid crystal capacitor via a drain and a source of the TFT. Further, the other end of the liquid crystal capacitor is connected to a common electrode line that is common to all the pixels. The common electrode driving section 13 is arranged to supply a voltage to be applied to the common electrode line.

In the liquid crystal display apparatus 1, the gate driving section 11 selects a gate line. Then, the source driving section 12 outputs, to each source line, an image data signal DAT for a pixel corresponding to a combination of the gate line and a source line that are being selected. This allows each image data to be written into the pixel that is connected to the gate line. Further, the gate driving section 11 sequentially selects the gate lines and the source driving section 12 outputs image data to the source lines. As a result, the respective image data is written into all of the pixels of the display panel 10, and an image corresponding to the image data signals DAT is displayed on the display panel 10.

Here, the image data sent from the control section 14 to the source driving section 12 is transmitted as image data signals DAT in a time-sharing manner. The source driving section 12 extracts each image data from the image data signals DAT according to timing on the basis of a source clock signal, an inversion source clock signal, and a source start pulse that become timing signals, and transmits the extracted image data to each pixel.

Next, the γ correction in the liquid crystal display apparatus 1 is explained.

For example, in the liquid crystal display apparatus that performs multi-gradation display including 256 gradations, 256 kinds of applied voltage values are required. However, in practice, it is not possible to include power source voltages that correspond to all of these gradation voltages, respectively. Therefore, in general, several kinds of reference voltages are prepared as the power source voltages. By dividing these reference voltages by resistance dividing means into partial voltages, applied voltages (gradation quasi-voltages) that correspond to all the gradations, respectively, are generated.

The resistance dividing means are composed of many resistors connected in series. An applied voltage that is obtained at each of connecting points of respective resistors is extracted according to switching control in accordance with the image data signal DAT. That is, the image data signal DAT is, for example, an 8-bit digital signal (in case where the number of gradations is 256). A desired applied voltage can be extracted from the 256 kinds of applied voltages, by carrying out 8-stage switching control with the use of each bit signal. Note that such resistance dividing means is a publicly known arrangement that is conventionally used in a liquid crystal display of a voltage modulation system. The source driving section 12 includes a gradation voltage generating circuit (not shown) that employs the resistance dividing means as mentioned above.

Here, a relationship between the gradation and the applied voltage in the liquid crystal apparatus is not proportional, but has a specific γ curve. Accordingly, a resistance value of each resistor is set so that the resistance dividing means of the gradation voltage generating circuit obtains a gradation voltage along the γ curve. In this way, the resistance value of each resistor is not set so that the reference voltages are proportionally distributed.

In the liquid crystal display apparatus 1, the gradation voltage generation circuit that supplies a gradation voltage to a source line that is connected to a B-color pixel should be set so that it becomes possible to obtain a gradation voltage along γ curve with respect to the B-color data in FIG. 3.

A method of the γ correction in the liquid crystal display apparatus 1 is not limited to this. The γ correction may be carried out by carrying out data conversion with respect to image data of a B-color. The γ correction in such a case is explained with reference to FIG. 5.

Figure 5:
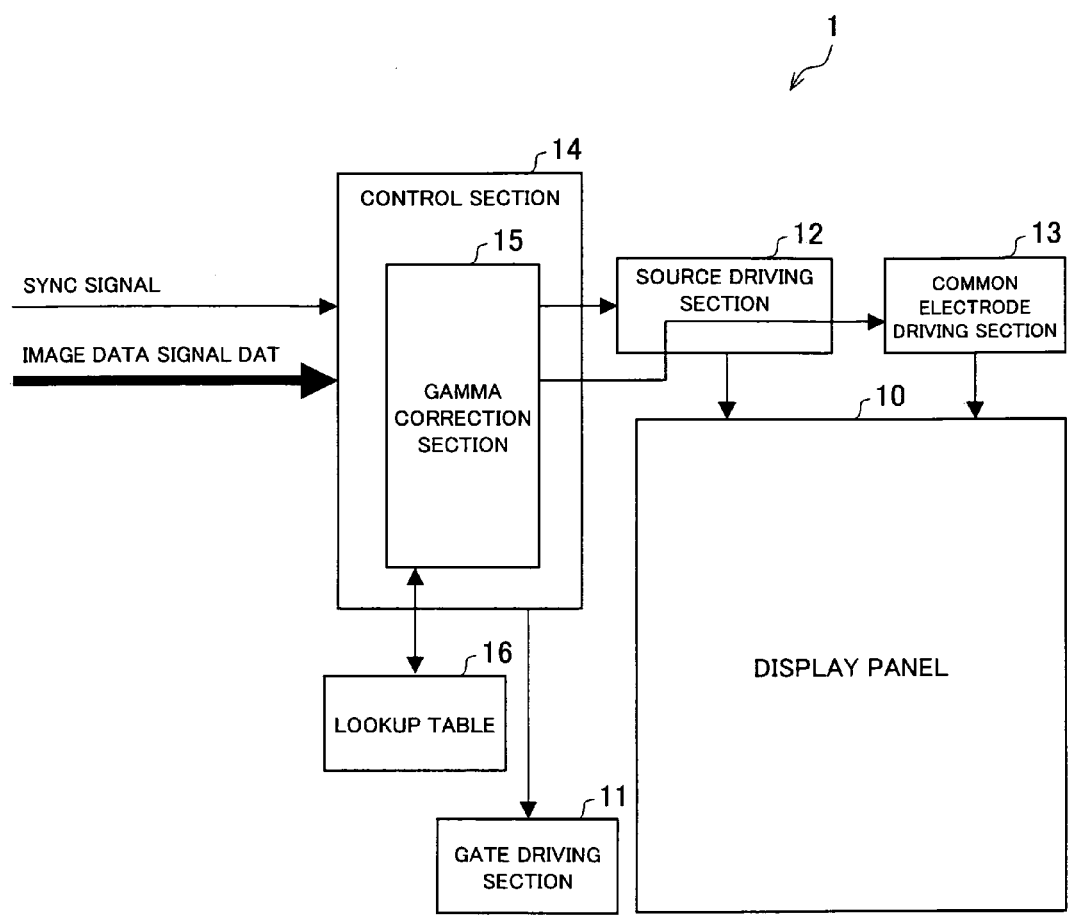
FIG. 5 is a block diagram schematically illustrating an example of an arrangement of the color liquid crystal display apparatus which example is different from the arrangement of FIG. 4.
Figure 6A:
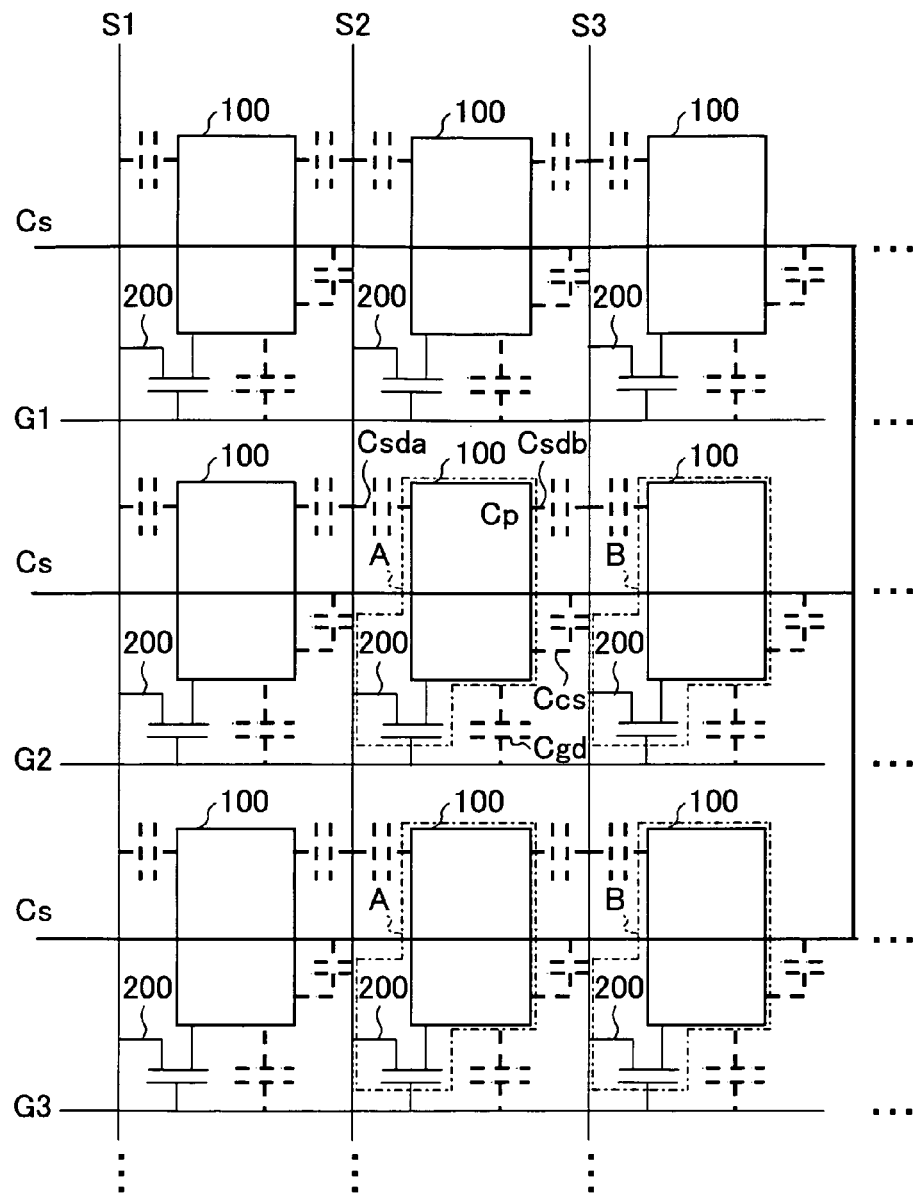
FIG. 6(a) is a diagram illustrating an arrangement of a display panel in a conventional liquid crystal display apparatus.
Figure 6B:
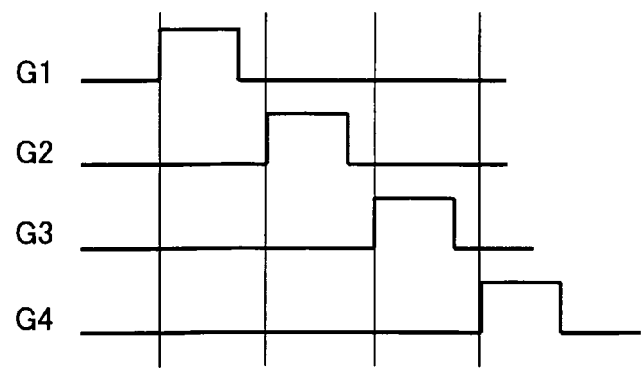
FIG. 6(b) is a diagram illustrating a state in which a voltage is applied to a gate line.
Figure 7:
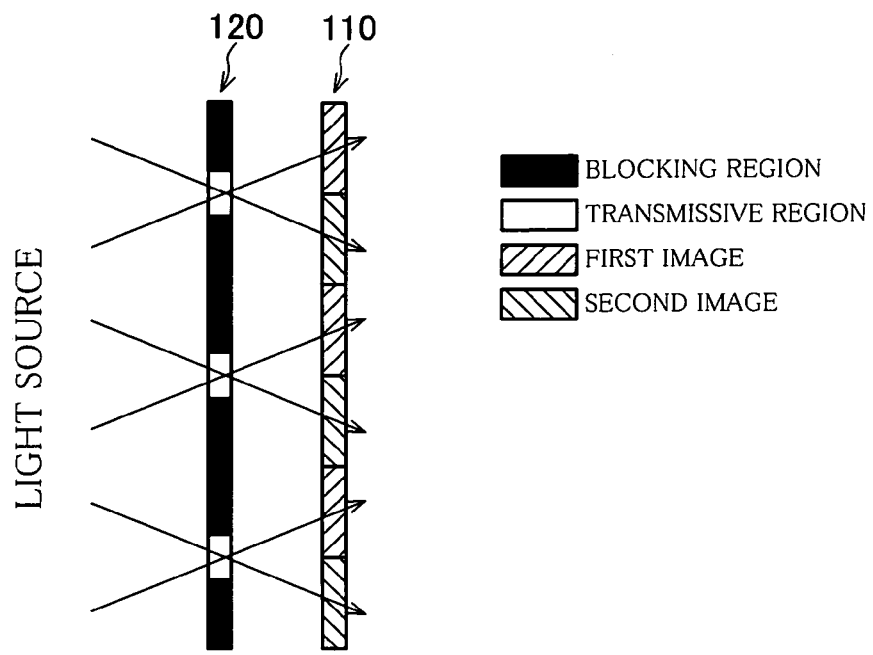
FIG. 7 is a diagram illustrating an effect of giving a viewing angle with the use of a viewing barrier in a dual view display.
Figure 8:
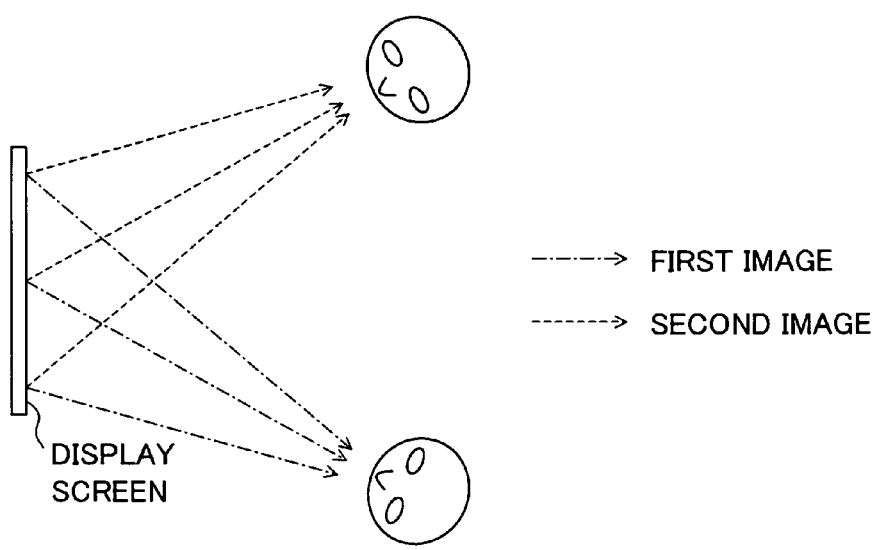
FIG. 8 is a diagram illustrating a relationship between a display screen and observers in a case where a dual view display is performed.

In this case, as illustrated in FIG. 5, the liquid crystal display apparatus 1 further includes a γ correction section 15 and a lookup table 16. In other words, the γ correction section 15 carries out data conversion with reference to the lookup table 16 so that image data of a B-color pixel stays along the γ curve with respect to the B-color data in FIG. 3.

Specifically, among data signals DAT that are inputted into the control section 14, image data of R and G colors are directly sent to the source driving section 12. However, image data of a B color is subjected to data conversion with the use of the γ correction section 15 and the lookup table 16, and then sent to the source driving section 12.

The lookup table 16 stores an input gradation level and an output gradation level so that the input gradation level and the output gradation level correspond to each other. When an input gradation level of the image data signal DAT is inputted from the γ correction section 15, an output gradation level corresponding to this input gradation level is read out. The γ correction section 15 outputs the output gradation level that is read out from the lookup table 16 to the source driving section 12.

For example, in the liquid crystal display apparatus 1, an ideal applied voltage along the γ curve with respect to the data of a B color in FIG. 3 is in a range of V' 0 to V' 255 (in the case of 256-gradation display). The following Table 1 is shows a relationship between (i) each of the applied voltages V' 0 to V' 255 and (ii) an applied voltage among the applied voltages V0 to V255 that are generated by the resistance dividing means for carrying out the 256 gradation display which applied voltage is the closest to the each of the applied voltages V' 0 to V' 255. Note that the Table 1 below shows an example in which a gradation equal to or less than $128^{th}$ gradation is set to γ 2.5. Moreover, in the Table 1, the output gradation indicates a voltage that corresponds to the output gradation.

In other words, in case where γ correction of the image data of a B color is to be performed along the γ curve with respect to the data of a B color in FIG. 3, for example, an applied voltage V1 that is generated by the resistance dividing means becomes the closest to an ideal applied voltage V'3 with respect to display of the input gradation level 3. Accordingly, the lookup table 16 should be set to have an output gradation level of 1 in a case where the input gradation level of the image data of a B color is 3.

As mentioned above, in a liquid crystal display apparatus of the present invention allowing a display mode in which a different image can be displayed with respect to each of a plurality of display directions to be realized by bonding a liquid crystal panel and a parallax barrier, the liquid crystal panel being provided with a display pixel including a switching element and a pixel electrode which display pixel corresponds to each intersection of a plurality of gate lines and a plurality of source lines: the parallax barrier separates display images viewed in different directions, respectively, by treating, as one unit, three pixels including R, G, and B pixels provided in a direction in which a gate line is extended; in a case where, among the three pixels constituting the one unit, a pixel that is present at one end in the direction in which the gate line is extended is a first display pixel and a pixel that is adjacent to the first display pixel and belongs to a display image that is separated into a display direction different from that of the first display pixel is a second display pixel, a source line connected to the second display pixel is adjacent to the first display pixel, the first display pixel is a display pixel of a B (blue) color, and an applied voltage to be supplied to the display pixel of the B (blue) color and an input gradation are

TABLE 1

| IG | OG(B) | IG | OG(B) | IG | OG(B) | IG | OG(B) | IG | OG(B) | IG | OG(B) | IG | OG(B) | IG | OG(B) |
|---|---|---|---|---|---|---|---|---|---|---|---|---|---|---|---|
| 0 | 0 | 32 | 25 | 64 | 58 | 96 | 92 | 128 | 128 | 160 | 160 | 192 | 192 | 224 | 224 |
| 1 | 0 | 33 | 26 | 65 | 59 | 97 | 93 | 129 | 129 | 161 | 161 | 193 | 193 | 225 | 225 |
| 2 | 1 | 34 | 27 | 66 | 60 | 98 | 95 | 130 | 130 | 162 | 162 | 194 | 194 | 226 | 226 |
| 3 | 1 | 35 | 28 | 67 | 61 | 99 | 96 | 131 | 131 | 163 | 163 | 195 | 195 | 227 | 227 |
| 4 | 2 | 36 | 29 | 68 | 62 | 100 | 97 | 132 | 132 | 164 | 164 | 196 | 196 | 228 | 228 |
| 5 | 2 | 37 | 30 | 69 | 63 | 101 | 98 | 133 | 133 | 165 | 165 | 197 | 197 | 229 | 229 |
| 6 | 3 | 38 | 31 | 70 | 64 | 102 | 99 | 134 | 134 | 166 | 166 | 198 | 198 | 230 | 230 |
| 7 | 4 | 39 | 32 | 71 | 65 | 103 | 100 | 135 | 135 | 167 | 167 | 199 | 199 | 231 | 231 |
| 8 | 5 | 40 | 33 | 72 | 66 | 104 | 101 | 136 | 136 | 168 | 168 | 200 | 200 | 232 | 232 |
| 9 | 5 | 41 | 34 | 73 | 67 | 105 | 102 | 137 | 137 | 169 | 169 | 201 | 201 | 233 | 233 |
| 10 | 6 | 42 | 35 | 74 | 68 | 106 | 103 | 138 | 138 | 170 | 170 | 202 | 202 | 234 | 234 |
| 11 | 7 | 43 | 36 | 75 | 69 | 107 | 104 | 139 | 139 | 171 | 171 | 203 | 203 | 235 | 235 |
| 12 | 8 | 44 | 37 | 76 | 71 | 108 | 106 | 140 | 140 | 172 | 172 | 204 | 204 | 236 | 236 |
| 13 | 9 | 45 | 38 | 77 | 72 | 109 | 107 | 141 | 141 | 173 | 173 | 205 | 205 | 237 | 237 |
| 14 | 9 | 46 | 39 | 78 | 73 | 110 | 108 | 142 | 142 | 174 | 174 | 206 | 206 | 238 | 238 |
| 15 | 10 | 47 | 40 | 79 | 74 | 111 | 109 | 143 | 143 | 175 | 175 | 207 | 207 | 239 | 239 |
| 16 | 11 | 48 | 41 | 80 | 75 | 112 | 110 | 144 | 144 | 176 | 176 | 208 | 208 | 240 | 240 |
| 17 | 12 | 49 | 42 | 81 | 76 | 113 | 111 | 145 | 145 | 177 | 177 | 209 | 209 | 241 | 241 |
| 18 | 13 | 50 | 43 | 82 | 77 | 114 | 112 | 146 | 146 | 178 | 178 | 210 | 210 | 242 | 242 |
| 19 | 14 | 51 | 44 | 83 | 78 | 115 | 113 | 147 | 147 | 179 | 179 | 211 | 211 | 243 | 243 |
| 20 | 14 | 52 | 45 | 84 | 79 | 116 | 114 | 148 | 148 | 180 | 180 | 212 | 212 | 244 | 244 |
| 21 | 15 | 53 | 46 | 85 | 80 | 117 | 115 | 149 | 149 | 181 | 181 | 213 | 213 | 245 | 245 |
| 22 | 16 | 54 | 47 | 86 | 81 | 118 | 117 | 150 | 150 | 182 | 182 | 214 | 214 | 246 | 246 |
| 23 | 17 | 55 | 48 | 87 | 83 | 119 | 118 | 151 | 151 | 183 | 183 | 215 | 215 | 247 | 247 |
| 24 | 18 | 56 | 49 | 88 | 84 | 120 | 119 | 152 | 152 | 184 | 184 | 216 | 216 | 248 | 248 |
| 25 | 19 | 57 | 50 | 89 | 85 | 121 | 120 | 153 | 153 | 185 | 185 | 217 | 217 | 249 | 249 |
| 26 | 20 | 58 | 51 | 90 | 86 | 122 | 121 | 154 | 154 | 186 | 186 | 218 | 218 | 250 | 250 |
| 27 | 21 | 59 | 52 | 91 | 87 | 123 | 122 | 155 | 155 | 187 | 187 | 219 | 219 | 251 | 251 |
| 28 | 22 | 60 | 54 | 92 | 88 | 124 | 123 | 156 | 156 | 188 | 188 | 220 | 220 | 252 | 252 |
| 29 | 23 | 61 | 55 | 93 | 89 | 125 | 124 | 157 | 157 | 189 | 189 | 221 | 221 | 253 | 253 |
| 30 | 23 | 62 | 56 | 94 | 90 | 126 | 125 | 158 | 158 | 190 | 190 | 222 | 222 | 254 | 254 |
| 31 | 24 | 63 | 57 | 95 | 91 | 127 | 126 | 159 | 159 | 191 | 191 | 223 | 223 | 255 | 255 |

(IG: INPUT GRADATION, OG(B): OUTPUT GRADATION (B))

set to have a relationship along a γ curve that makes luminance variation difficult to occur in a low luminance area, compared with applied voltages supplied to display pixels of R (red) and G (green) colors, respectively.

According to the arrangement, in a pixel other than the first display pixel, influence of crosstalk from other source line (other than a source line that supplies data to the pixel other than the first display pixel) is hard to appear because the pixel other than the first display pixel and a pixel that is connected to the other source line relate to the same image and are highly correlated to each other. On the other hand, influence of crosstalk that is caused by other source line (other than a source line that supplies data to the first display pixel) easily appears in the first display pixel because the first display pixel and a pixel that is connected to the other source line relates to images different from each other and are not correlated.

In other words, influence of the crosstalk is concentrated in the first display pixel, by treating three pixels including R, G, and B pixels as one unit in separation of display images with the use of a parallax barrier at the time when a dual view display is performed. By arranging the first display pixel to be a B pixel that has a low correlation with luminance information, a change in a luminance due to the crosstalk can be suppressed. Accordingly, influence of the crosstalk to a display screen can be reduced.

Further, the applied voltage to be supplied to the display pixel of the B (blue) color and the input gradation are set to have a relationship along a γ curve that makes luminance variation difficult to occur in a low luminance area (dark area), compared with applied voltages supplied to display pixels of R (red) and G (green) colors, respectively (γ of B is set large in the dark area).

This is for two reasons. A ratio of luminance variation due to crosstalk becomes larger in a darker area. However, in an area that is darker than a certain level, even if the luminance changes at a large ratio, the luminance variation becomes insensible. In a bright area, because the ratio of the luminance variation is small, it is clearly not necessary to care about color crosstalk. That is, influence of the color crosstalk is the largest in a half-tone area that is relatively dark. Luminance variation in the relatively dark area can be avoided by setting γ so that γ on a low gradation side is relatively large. γ may be separately set such that, for example, γ of a gradation not more than a certain level is 2.5 and γ of a gradation not less than the certain level is 2.2. In particular, it is preferable to set γ so that γ of a gradation not less than $128^{th}$ gradation is 2.2 and γ of a gradation not more than $128^{th}$ gradation varies sequentially from 2.2 towards 2.5 that is γ at $0^{th}$ gradation. This is for the purpose of realizing a gradation display characteristic that is relatively sequential and smooth even in a case where the crosstalk tends to influence the gradation display. The γ of 2.5 that is set here is one example. The γ may be set as appropriate according to an application, as long as a video image does not deviate largely from the image in a case where γ is set to 2.2 as in a general case.

Moreover, the liquid crystal display apparatus may include: a reference voltage generating circuit that generates an applied voltage to be supplied to the display pixel of the B (blue) color, the reference voltage generating circuit performing an input gradation signal/applied voltage conversion along the γ curve that makes the luminance variation difficult to occur in the low luminance area.

According to the arrangement, an input gradation signal-application voltage relationship can be arranged along an optimum γ curve.

Further, the liquid crystal display apparatus may include: a data converting section converting input gradation data of the B (blue) color so as to generate an output gradation signal to be outputted to a data driving section, the data converting section carrying out data conversion so that an output gradation signal-applied voltage relationship is along the γ curve that makes the luminance variation difficult to occur in the low luminance area According to the arrangement, it is not necessary to separately have a reference voltage generating circuit for a B (blue) color and a reference voltage generation circuit for R (red) and G (green) colors. Therefore, the gradation signal-applied voltage relationship can be arranged along an appropriate γ curve in a simple arrangement.

The invention claimed is:

1. A liquid crystal display apparatus allowing a display mode in which a different image can be displayed with respect to each of a plurality of display directions to be realized by bonding a liquid crystal panel and a parallax barrier,
the liquid crystal panel being provided with display pixels including switching elements and pixel electrodes, the display pixels corresponding to intersections of a plurality of gate lines and a plurality of source lines, wherein:
the parallax barrier separates display images viewed in different directions, respectively, by treating, as one unit, three display pixels including red (R), green (G), and blue (B) pixels provided in a direction in which a gate line is extended;
one of the three display pixels is at one end in the direction in which the gate line is extended and is a first display pixel, and another display pixel that is adjacent to the first display pixel and belongs to a display image that is separated into a display direction different from that of the first display pixel is a second display pixel,
a source line connected to the second display pixel is adjacent to the first display pixel,
the first display pixel is a display pixel of the B color, and
an applied voltage to be supplied to the display pixel of the B color and an input gradation are set to have a relationship along a γ curve, the applied voltage to be supplied to the display pixel of the B color producing a luminance having a lesser variation than luminances produced by applied voltages supplied to display pixels of R and G colors, respectively.

2. The liquid crystal display apparatus as set forth in claim 1, comprising:
a reference voltage generating circuit that generates an applied voltage to be supplied to the display pixel of the B color, the reference voltage generating circuit performing an input gradation signal/applied voltage conversion along the γ curve.

3. The liquid crystal display apparatus as set forth in claim 1, comprising:
a data converting section converting input gradation data of the B color so as to generate an output gradation signal to be outputted to a data driving section,
the data converting section carrying out data conversion so that an output gradation signal-applied voltage relationship is along the γ curve.

4. A liquid crystal display apparatus comprising:
a display panel including,
a plurality of gate lines,
a plurality of source lines intersecting the plurality of gate lines, the intersections corresponding to locations of at least a first plurality of pixels and a second plurality of pixels,
at least a first picture element having the first plurality of pixels, the first picture element being configured to display a first image, and at least a second picture element having the second plurality of pixels, the second picture element configured to display a second image, the second image being in a different display direction than the first image, wherein a first pixel of the first plurality of pixels is a first color pixel, a first pixel of the second plurality of pixels is a second color pixel, and a first source line of the plurality of source lines is connected to the first pixel of the second plurality of pixels and the first source line is adjacent to the first pixel of the first plurality of pixels; and a reference voltage generating circuit configured to generate an applied voltage for the first pixel of the first plurality of pixels based on an input gradation signal and a first γ curve, the reference voltage generating circuit configured to generate an applied voltage for the first pixel of the second plurality of pixels based on an input gradation signal and a second γ curve, the second γ curve being different than the first γ curve.

5. The liquid crystal display apparatus of claim 4, wherein the first plurality of pixels includes red, green and blue pixels and the second plurality of pixels includes red, green and blue pixels.

6. The liquid crystal display apparatus of claim 5, wherein the first pixel of the first plurality of pixels is a blue pixel and the first pixel of the second plurality of pixels is a red pixel.

7. The liquid crystal display apparatus of claim 4, wherein the first plurality of pixels includes red, green and blue pixels and the second plurality of pixels includes red, green and blue pixels.

8. The liquid crystal display apparatus of claim 7, wherein the first pixel of the first plurality of pixels is a blue pixel and the first pixel of the second plurality of pixels is a red pixel.

* * * * *